United States Patent
Roach et al.

(10) Patent No.: US 9,056,582 B2
(45) Date of Patent: Jun. 16, 2015

(54) INDICATION SYSTEM FOR A MACHINE

(71) Applicant: Caterpillar Inc., Peoria, IL (US)

(72) Inventors: Keegan W. Roach, Peoria, IL (US);
Nathan French, Metamora, IL (US);
Brad R. Van De Veer, Washington, IL (US); Andrew J. Kieser, Peoria, IL (US); Robert L. Powers, Dunlap, IL (US); Thomas E. Beccue, Germantown Hills, IL (US); Michael D. Valerio, Morton, IL (US)

(73) Assignee: Caterpillar Inc., Peoria, IL (US)

( * ) Notice: Subject to any disclaimer, the term of this patent is extended or adjusted under 35 U.S.C. 154(b) by 56 days.

(21) Appl. No.: 13/956,402

(22) Filed: Aug. 1, 2013

(65) Prior Publication Data

US 2015/0035659 A1   Feb. 5, 2015

(51) Int. Cl.
*B60Q 1/00* (2006.01)
*B60Q 1/26* (2006.01)

(52) U.S. Cl.
CPC ........................................ *B60Q 1/26* (2013.01)

(58) Field of Classification Search
CPC ..................................... E02F 3/04; G07C 3/00
USPC ................. 340/425.5, 438, 431; 37/308, 309; 60/273, 277; 116/284; 403/27; 348/159
See application file for complete search history.

(56) References Cited

U.S. PATENT DOCUMENTS

| 3,052,870 | A | | 9/1962 | Pieper | |
|---|---|---|---|---|---|
| 4,369,428 | A | | 1/1983 | Tanaka | |
| 5,636,648 | A | * | 6/1997 | O'Brien et al. | 134/107 |
| 5,844,479 | A | | 12/1998 | Walton | |
| 2001/0037759 | A1 | * | 11/2001 | Schlegel et al. | 116/284 |
| 2008/0244936 | A1 | * | 10/2008 | Imaizumi et al. | 37/308 |
| 2014/0064824 | A1 | * | 3/2014 | Nilsson et al. | 403/27 |
| 2014/0240506 | A1 | * | 8/2014 | Glover et al. | 348/159 |

* cited by examiner

*Primary Examiner* — Brent Swarthout

(57) ABSTRACT

A visual indication system for a machine is provided. The visual indication system includes an output module configured to be displayed at an external location relative to an internal portion of a cabin of the machine and configured to provide a visual indication viewable. The visual indication system also includes a controller communicably coupled to the output module. The controller is configured to receive a signal indicative of a parking status and an implement status of the machine. Further, the controller is configured to determine a locked state associated with the parking status and the implement status. The controller is configured to transmit the visual indication of the determined locked state to the output module.

8 Claims, 9 Drawing Sheets

INDICATION SYSTEM FOR A MACHINE

TECHNICAL FIELD

The present disclosure relates to an indication system, and more particularly to an indication system for notifying a bystander of an operational status of a machine.

BACKGROUND

Second persons, such as a supervisor or a site manager, may need to mount a machine while a first person or operator is present on the machine. This may be for a variety of purposes. For example, the second may wish to communicate face to face with the operator, for testing purposes and/or for servicing reasons. The second person must avoid mounting the machine while the machine is in an operational state.

However, sometimes the second person attempts to mount the machine while the operator is present in his seat and the machine is still running. It is a recommended practice that the second person should mount the machine when the machine is not moving on the ground, i.e. the machine is in a parked state. Also, an implement of the machine should not be in an operational or moving state, i.e. the implement must also be in a locked state. For this reason, the parking status and the implement status of the machine should be known to the second person prior to mounting the machine.

Some machines make use of implement and park lock controls which are present as rocker switches with mechanical locking tabs within an operator cabin of the machine. Additionally, in some situations these machines may also include an operator presence detection system. The implement and park lock controls along with the operator presence detection system may serve as a means utilized by the operator of the machine for prevention of inadvertent actuation of the machine and/or the implement associated with the machine. This however, does not make the second person aware of the parking status and the implement status of the machine from a location outside that of the machine.

Known solutions include the use of large physical levers which may be indicative of the parking status and the implement status, based on a position of the levers. In this scenario, the second person needs to ascertain the position of the levers from outside the machine by visual inspection, in order to determine the parking status and the implement status of the machine.

U.S. Pat. No. 4,369,428 relates to an operation of a parking brake of an automobile, a switching means responsive to the operation of the parking brake is disposed between the ignition switch and a power side terminal of the stop lights for indicating the braking of the automobile. The operation of the parking brake is thus indicated to the drivers of automobiles coming from behind, thereby preventing a collision from behind or the other accidents.

SUMMARY OF THE DISCLOSURE

In one aspect of the present disclosure, a visual indication system for a machine is provided. The visual indication system includes an output module configured to be displayed at an external location relative to an internal portion of a cabin of the machine and configured to provide a visual indication viewable. The visual indication system also includes a controller communicably coupled to the output module. The controller is configured to receive a signal indicative of a parking status and an implement status of the machine. Further, the controller is configured to determine a locked state associated with the parking status and the implement status. The controller is configured to transmit the visual indication of the determined locked state to the output module.

In another aspect of the present disclosure, a method of indicating an operational status of a machine is provided. The method includes receiving a signal indicative of a parking status of the machine. The method also includes receiving a signal indicative of a status associated with an implement of the machine. The method further includes determination of a locked state associated with the parking status and the implement status of the machine. The method includes transmission of a visual indication of the determined locked state to an output module configured to be displayed at an external location relative to a cabin of the machine.

In yet another aspect of the present disclosure, a machine is provided. The machine includes a power source, a body and an implement. An output module is configured to be displayed at an external location relative to a cabin of the machine and configured to provide a visual indication viewable The machine also includes a controller communicably coupled to the output module. Further, the controller is configured to receive a signal indicative of a parking status of the machine. The controller is also configured to receive a signal indicative of a status associated with the implement of the machine. Further, the controller is configured to determine a locked state associated with the parking status and the implement status and transmit the determined locked state to the output module.

Other features and aspects of this disclosure will be apparent from the following description and the accompanying drawings.

DETAILED DESCRIPTION

Figure 1:
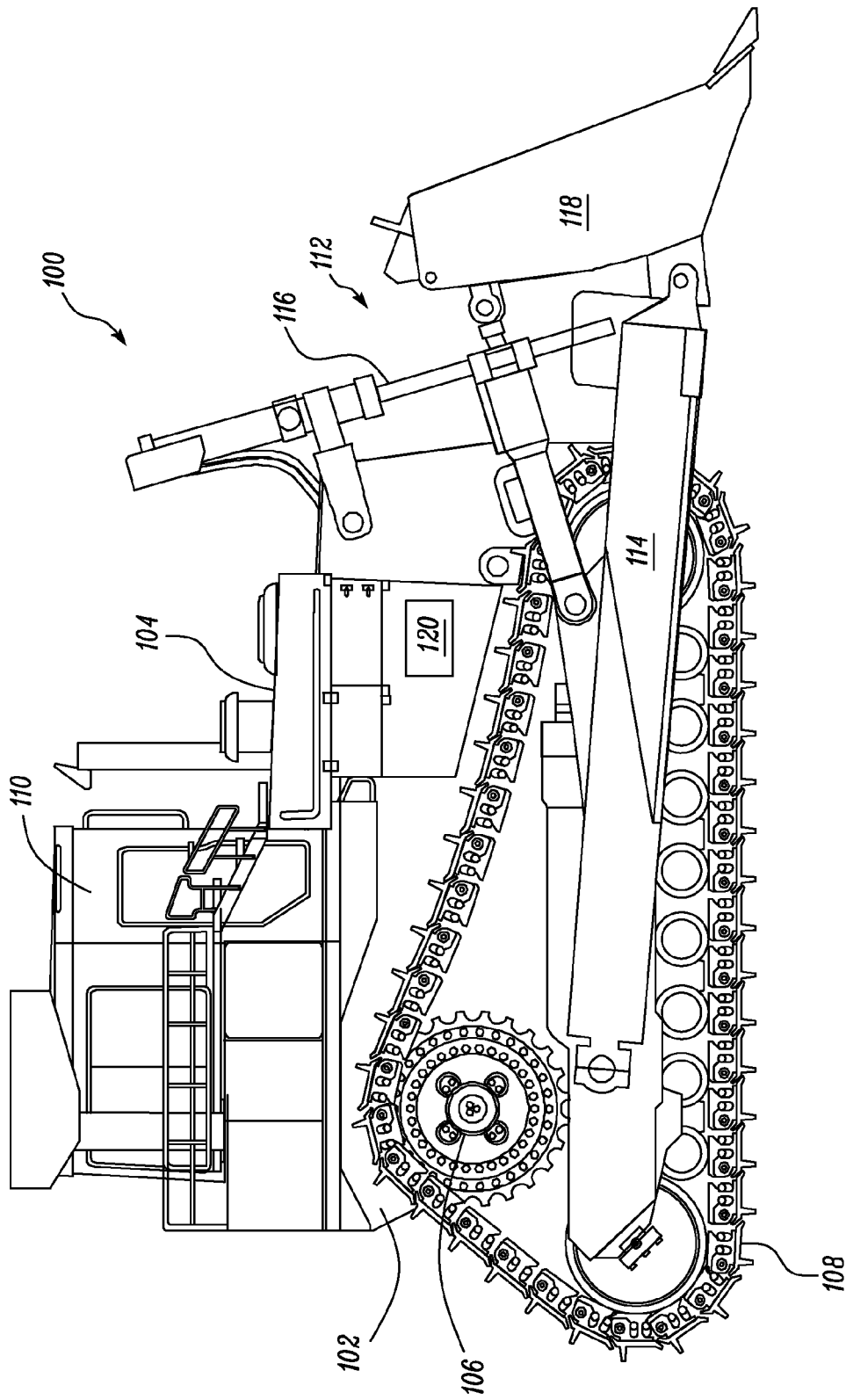
FIG. 1 is a side view of an exemplary machine, according to one embodiment of the present disclosure.

Wherever possible, the same reference numbers will be used throughout the drawings to refer to the same or the like parts. FIG. 1 illustrates an exemplary machine 100 according to one embodiment of the present disclosure. As illustrated, the machine 100 may embody a track type tractor. Alternatively, the machine 100 may include, but is not limited to, a backhoe loader, a skid steer loader, a wheel loader, a motor grader and the like. It should be understood that the machine 100 may embody any wheeled or tracked machine associated with mining, agriculture, forestry, construction and other industrial applications.

As illustrated in FIG. 1, the machine 100 includes a body 102, a power source (not shown) housed within an enclosure 104, a transmission system (not shown), and a propulsion system 106. In one embodiment, the power source may include, for example, a diesel engine, a gasoline engine, a gaseous fuel powered engine such as a natural gas engine, a combination of known sources of power or any other type of engine apparent to one of skill in the art. The transmission system is communicably coupled to the power source. The transmission system may include coupling elements for transmitting a drive torque from the power source to the propulsion system 106. The propulsion system 106 may include a track 108 having ground engaging elements configured to propel the machine 100 on ground. Alternatively, the ground engaging elements may include wheels provided for mobility of the machine 100. The machine 100 also includes an operator cabin 110.

A user command may be received through various input devices present within the operator cabin 110 of the machine 100. The user command may be indicative of inputs provided by an operator for controlling the movement and/or operation of the machine 100. Based on the user command, a parking status associated with the machine 100 may be in a locked or unlocked state. The locked parking status of the machine 100 is indicative that the machine 100 is no longer moving on the ground and that the machine 100 has a speed of zero. The unlocked parking status of the machine 100 is indicative that the machine 100 is capable of movement on the ground.

Further, the machine 100 includes a load lifting assembly 112 having a lift arm 114, one or more hydraulic actuators 116 and an implement 118, such as a blade or bucket. The implement 118 is capable of movement for performing digging, collection, holding and conveying of material and/or heavy objects present on the ground. The hydraulic actuators 116 may be configured to effectuate the movement of the implement 118 based on the user command. Further, depending on whether the implement 118 is moving or not, an implement status associated with the implement 118 may vary as per the operation being performed by the machine 100. Accordingly, the implement status of the machine 100 may be a locked implement status when the implement 118 is stationary and is at a fixed position, whereas the implement status of the machine 100 may be an unlocked implement status when the implement 118 is free to move under the user command.

A second person or bystander, such a supervisor, technician, or a site manager, may need to mount the machine 100 for various purposes. The bystander should be made aware of the parking status and the implement status of the machine 100 prior to mounting the machine 100.

In another situation, there may be several maintenance and service tasks that require the operator to be in the operator cabin 110 and the bystander to be in close proximity to the running machine 100 at the same time. In this case, the bystander is often working on or around the running machine 100. It is recommended that as soon as the given task is complete, the parking status and the implement status of the machine 100 should be in the locked states respectively for performing the remainder of the task. However, occasionally, the operator may forget to engage or lock parking brakes and/or the implement 118 of the machine 100.

The present disclosure relates to a visual indication system 300 (see FIG. 3) for the machine 100. The visual indication system 300 includes an input module 302, a controller 304 and an output module 120. The controller 304 is configured to transmit a visual indication of the parking status and/or the implement status of the machine 100 to the output module 120. The output module 120 is configured to display the visual indication allowing for the bystander to be aware of the parking status and the implement status of the machine 100 from the ground and prior to mounting the machine 100. It should be noted that if the parking status and the implement status of the machine 100 can be ascertained from the ground, then the bystander present in immediate proximity of the machine 100 may be capable of error checking and reminding the operator to apply the implement lockout and/or the park brake while performing certain tasks. A detailed description of the working of the visual indication system 300 will be explained in connection with FIG. 3.

As shown in FIG. 1, the output module 120 of the visual indication system 300 may be coupled to the machine 100 such that the output module 120 is visible to the bystander from a location remote or outside that of the machine 100. The output module 120 may be coupled to the machine 100 in a line of sight of the bystander, more specifically at a location from which the machine 100 can be engaged by the bystander, and in particular, for climbing onto the machine 100 to access the operator cabin 110.

In the illustrated embodiment, the output module 120 is coupled to a lower section of the body 102 of the machine 100. This positioning of the output module 120 is such that the visual indication is viewable by the bystander prior to climbing onto the machine 100 for accessing the operator cabin 110. Alternatively, the output module 120 may be coupled to a lower portion of a service compartment door or operator cabin door of the machine 100.

In another embodiment, the output module 120 may be attached to a mounting device, such as, for example, a ladder, which is utilized by the operator or the bystander to climb onto the machine 100. For example, the output module 120 is placed or positioned on the rungs of the ladder, such that the output module 120 is visible to the bystander from the ground. It should be noted that the output module 120 may be positioned proximate to all the mounting locations associated with the machine 100. For example, if the machine 100 is mountable from either side, the output module 120 may be present at both of these mounting locations. Further, in yet another embodiment, the output module 120 may be coupled such that the output module 120 is visible to the bystander standing at a distance from the machine 100. For example, the output module 120 may be coupled to an upper portion of the machine 100 or a roof or a hood of the machine 100.

Figure 2:
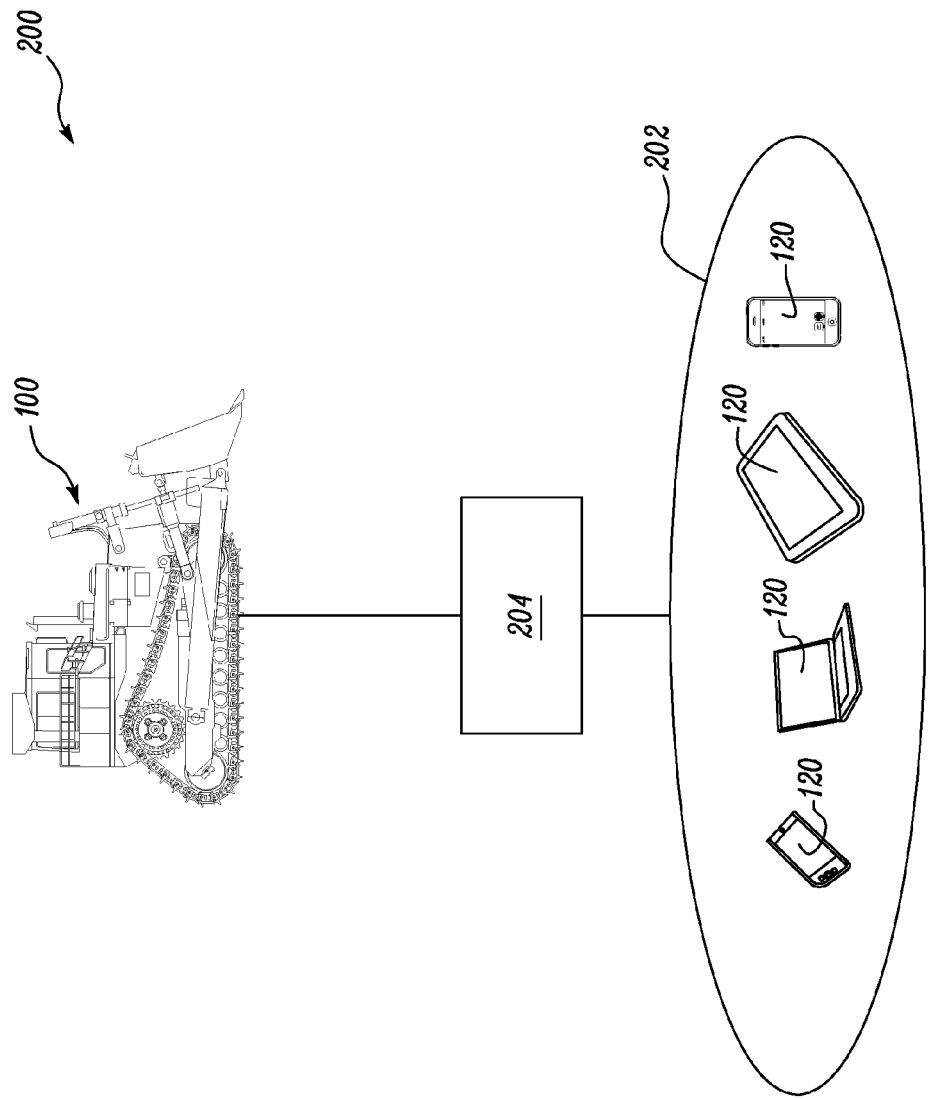
FIG. 2 is an exemplary environment in which a visual indication system for the machine operates, according to another embodiment of the present disclosure.

FIG. 2 illustrates an alternative implementation of the visual indication system 300, according to various embodiments of the present disclosure. As shown, in an exemplary environment 200, the controller 304 present onboard the machine 100 is in communication with a number of remote computing systems, such as handheld devices 202, via a communication system 204. The communication system 204 may be, but not limited to, a wide area network (WAN), a local area network (LAN), an Ethernet, an Internet, an Intranet, a cellular network, a satellite network, or any other suitable network for transmitting data between the controller 304 and the output module 120. In various embodiments, the communication system 204 may include a combination of two or more of the aforementioned networks and/or other types of networks known in the art.

In the illustrated embodiment, the output module 120 is coupled to the handheld device 202 operable by the bystander. The handheld device 202 may be a mobile phone, a personal digital assistant, a notebook, tablet and the like. Alternatively, the remote computing system may include a computer situated at a distant operator station, such as, for example, a site managing office, for remotely controlling an operation of the machine 100. The connections between the controller 304 and the output module 120 present on the handheld device 202 is wireless. It should be noted that the data transmission between the controller 304 and the output module 120 may occur over the communication system 204 in an encrypted, any other secure format, or in any of a wide variety of known manners.

Figure 3:
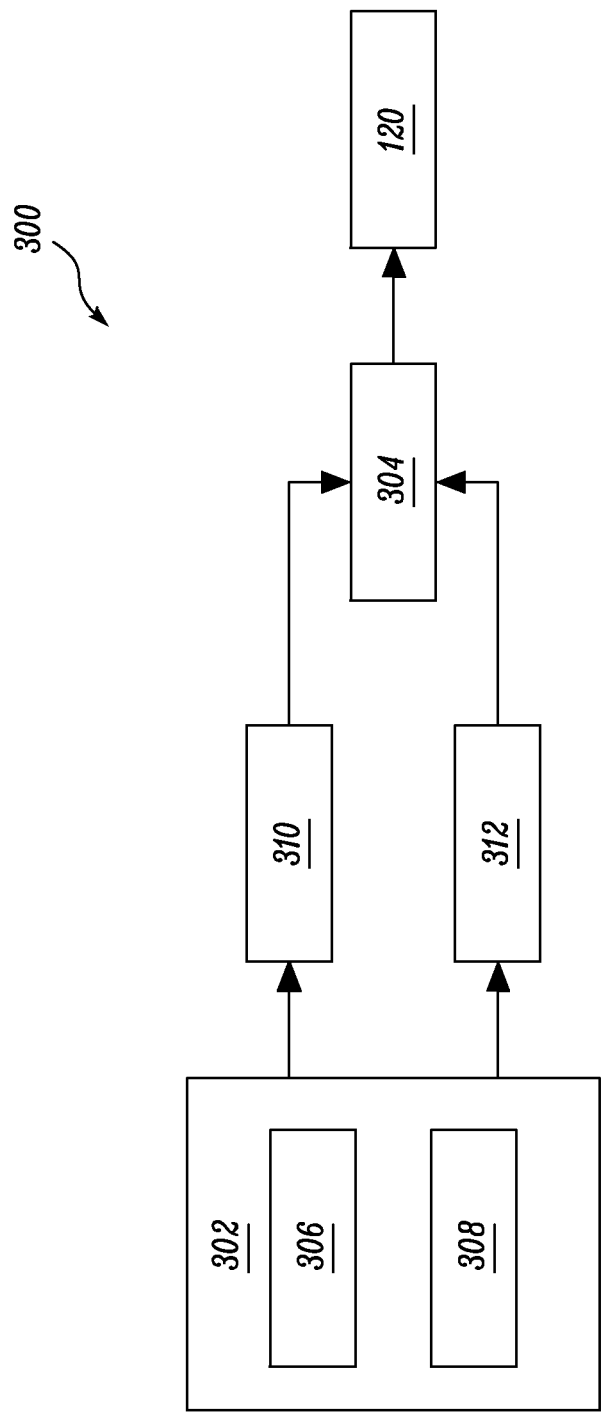
FIG. 3 is a block diagram of the visual indication system.

Referring now to FIG. 3, a block diagram of the visual indication system 300 is illustrated. As described earlier, the visual indication system 300 includes the input module 302, the controller 304 and the output module 120. In one embodiment, the input module 120 may be located inside the operator cabin 110 of the machine 100. The input module 120 further includes an input device for allowing the operator of the machine 100 to change the parking status and the implement status of the machine 100.

For example, a park lock switch 306 present within the operator cabin 110 of the machine 100 may be operated to change the parking status to the unlocked or locked state. Additionally, an implement switch 308 present within the operator cabin 110 may be activated to effectuate a change in the implement status of the machine 100. It should be noted that the input device may be any conventional switch, lever, button and the like. In another embodiment, the input module 302 may be present at the remote location for controlling the operation of the machine 100.

Further, a first sensor 310 and a second sensor 312 may be communicably coupled to the park lock switch 306 and the implement switch 308 of the input module 302 respectively. The first and the second sensors 310, 312 are configured to sense the parking status and the implement status of the machine 100 based on a position of the park lock switch 306 and the implement switch 308 respectively. Further, these first and second sensors 310, 312 are configured to send signals indicative of the parking status and the implement status to the controller 304 based on the user command issued by the operator of the machine 100.

It should be noted that in some situations, the user command may fail to indicate a current parking status and a current implement status of the machine 100. For example, the park lock switch 306 and/or the implement switch 308 may be faulty. In this situation the position of the faulty park lock switch 306 and/or the faulty implement switch 308 may be indicative of the status different from that of the current status of the machine 100. In another scenario, a time delay may exist between an activation of the park lock switch 306 and an actual application of a braking mechanism associated with the machine 100 in order to bring the machine 100 to a halt. Similarly, a time delay may exist between changing the position of the implement switch 308 and a corresponding locking or unlocking of the implement 118 of the machine 100.

Accordingly, in one embodiment, the signal indicating the parking status and the implement status of the machine 100 may be sent to the controller 304 by an electronic control module (not shown) present on the machine 100. The electronic control module is configured to determine the parking status and/or the implement status of the machine 100 using known methods. For example, in one situation, the signal indicating the parking status of the machine 100 may be determined by the electronic control module based on a machine speed signal. In another case, the electronic control module may determine the parking status of the machine 100 based on a hydraulic pressure associated with the braking mechanism of the machine 100.

Further, the signal indicating the implement status of the machine 100 may be sent to the electronic control module by an accelerometer, an inclinometer, a position sensor, and/or a pressure sensor associated with the implement 118 of the machine 100. One of ordinary skill in the art will appreciate that the signals issued by the above mentioned sensors are indicative of the current implement status of the machine 100. These signals may be sent to the controller 304 either directly by the appropriate sensors or through the electronic control module of the machine 100.

It should be noted that in a situation in which an operator detection system is present on the machine 100, the machine 100 may enter into an auto shutdown mode irrespective of the position of the park lock switch 306 or the implement switch 308. In this case, the signals issued by the electronic control module may be indicative of the current parking status and the current implement status of the machine 100. Accordingly, the electronic control module or the other sensors present on the machine 100 may be configured to transmit the signals indicative of the parking status and the implement status to the controller 304.

Based on the received signals, the controller 304 is configured to determine the locked state associated with at least one of the parking status and the implement status of the machine 100. Further, the controller 304 is configured to transmit the visual indication of the locked state of the parking status and/or the implement status of the machine 100 to the output module 120 for display. The output module 120 may include a digital display device, an LCD device, an LED device, a CRT monitor, a touchscreen device or any other display device known in the art. As explained earlier, the display may be viewable to the bystander via the output module 120 which is present on the machine 100 and/or the output module 120 which is located on the handheld device 202.

In the present disclosure, the visual indication provided to the bystander is indicative of the parking status and/or the implement status of the machine 100. In one embodiment, a first visual indication may be provided to the bystander via the output module 120 when both the parking status and the implement status of the machine 100 are determined to be in the locked state respectively. In another embodiment, a second visual indication may be provided to the bystander when any one or both of the parking status and the implement status of the machine 100 are in the unlocked state. One of ordinary skill in the art will appreciate that the first and second visual indications are based on a combined status of the parking status and the implement status of the machine 100. It should be noted that the bystander must avoid mounting the machine 100 if either of the parking status of the machine 100 is in the unlocked state, the implement status of the machine 100 is in the unlocked state or both the parking and implement status of the machine 100 is in the unlocked state.

The visual indication of the determined parking status and the implement status may be provided to the bystander in a variety of ways. In an embodiment, the bystander may be provided with the combined visual indication of the parking status and the implement status of the machine 100. Alternatively, separate visual indications may be provided for the parking status and the implement status of the machine 100. The visual indication may be displayed as a combination of icons, indicator lights and/or text messages. Various exemplary visual indications displayed via the output module 120 will be explained in connection with FIGS. 4A, 4B, 5A, 5B, 6 to 8.

Figure 4A:
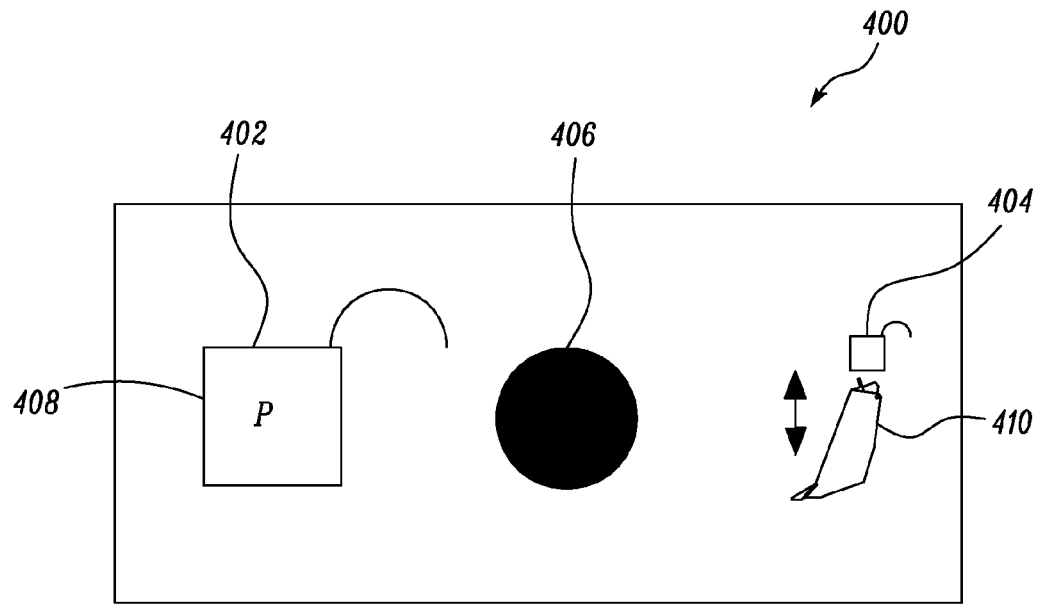
FIGS. 4A, 4B, 5A, 5B, 6 to 8 are different exemplary displays associated with the visual indication system, according to various embodiments of the present disclosure.
Figure 4B:
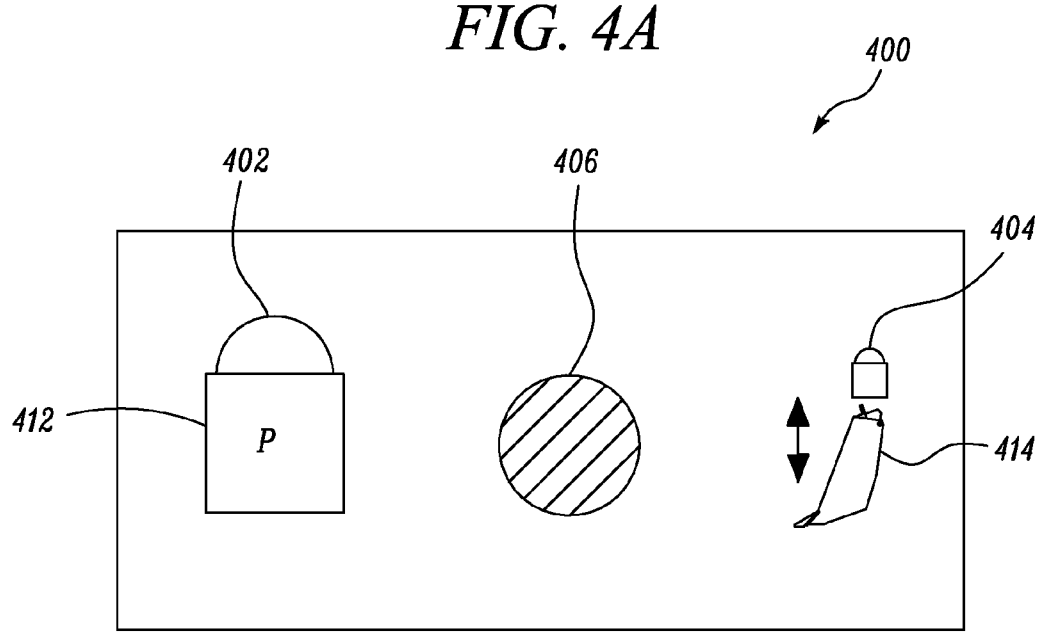

FIGS. 4A and 4B depict a set of exemplary displays 400 provided at the output module 120 at different instants of time. The display 400 is provided on a digital display unit. The display 400 includes a first icon 402 and a second icon 404. The first icon 402 is indicative of the parking status of the machine 100. The second icon 404 is indicative of the implement status of the machine 100. The display 400 also includes an indicator light 406. A change in color of light emitted by the indicator light 406 is used to indicate a combined locked state of the parking status and the implement status of the machine 100. More specifically, the indicator light 406 may glow of a first color, e.g., green, when both the parking status and the implement status of the machine 100 are in the locked state. The indicator light 406 may glow of a second color, e.g., red, when any one or both of the parking status and the implement status are in the unlocked state.

Referring to FIG. 4A, the first icon 402 indicates that the parking status of the machine 100 is in the unlocked state 408, as determined by the controller 304. Further, the second icon 404 present on the display 400 indicates that the implement status of the machine 100 is in the unlocked state 410. In this case, since both the parking status and the implement status determined by the controller 304 are in the unlocked state 408, 410, the indicator light 406 glows red. This is depicted as a shaded circle in the accompanying drawings. In the illustrated embodiment, the red light emitted by the indicator light 406 embodies the second visual indication provided to the bystander. The bystander is accordingly made aware that he should avoid mounting the machine 100.

In another situation, shown in FIG. 4B, the first and second icons 402, 404 indicate that the parking status and the implement status of the machine 100 are in the locked state 412, 414 respectively. Accordingly, the indicator light 406 glows green (shown by the hatched section in drawings) indicating to the bystander that the machine 100 may be engaged for cabin access or other purposes such as for servicing. In this case, the green color of the indicator light 406 provides the first visual indication to the bystander. One of ordinary skill in the art will appreciate that instead of a single indicator light, a set of lights may be used to indicate the locked and the unlocked states associated with the parking status and the status of the implement of the machine 100.

Figure 5A:
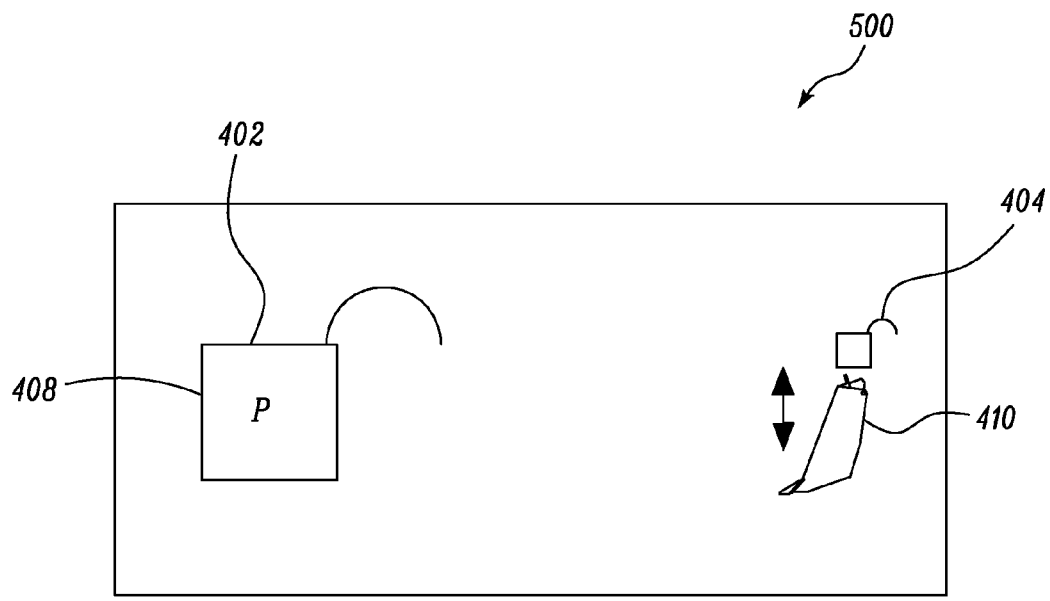
Figure 5B:
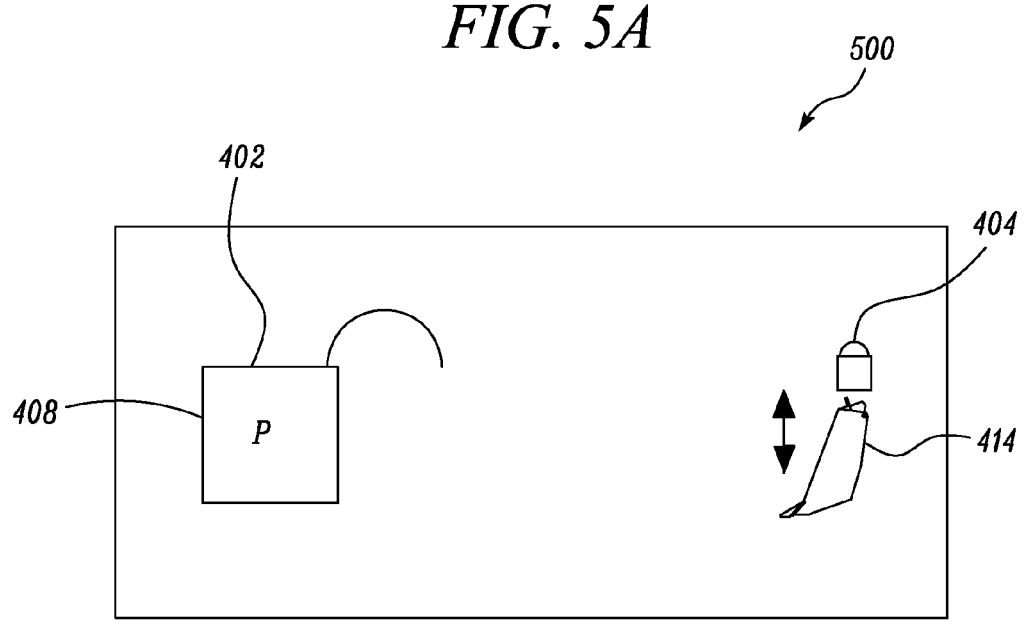

FIGS. 5A and 5B illustrate another set of exemplary displays 500 for displaying the parking status and the implement status of the machine 100. In this example, the display 500 includes only the first and second icons 402, 404 for depicting the locked or unlocked state of the parking status and the implement status of the machine 100. In FIG. 5A, the first icon 402 indicates that the parking status is in the unlocked state 408. Further, the second icon 404 indicates the implement status is also in the unlocked state 410. Based on the visual indications provided by the first and second icons 402, 404, the bystander can infer that he should avoid mounting the machine 100.

Referring to FIG. 5B, the first icon 402 indicates that the parking status of the machine 100 is in the unlocked state 408. The second icon 404 indicates that the implement status is in the locked state 414. Accordingly, based on the individual visual indications of the parking status and the implement status of the machine 100, it may be evident to the bystander that he should avoid mounting the machine 100.

Figure 6:
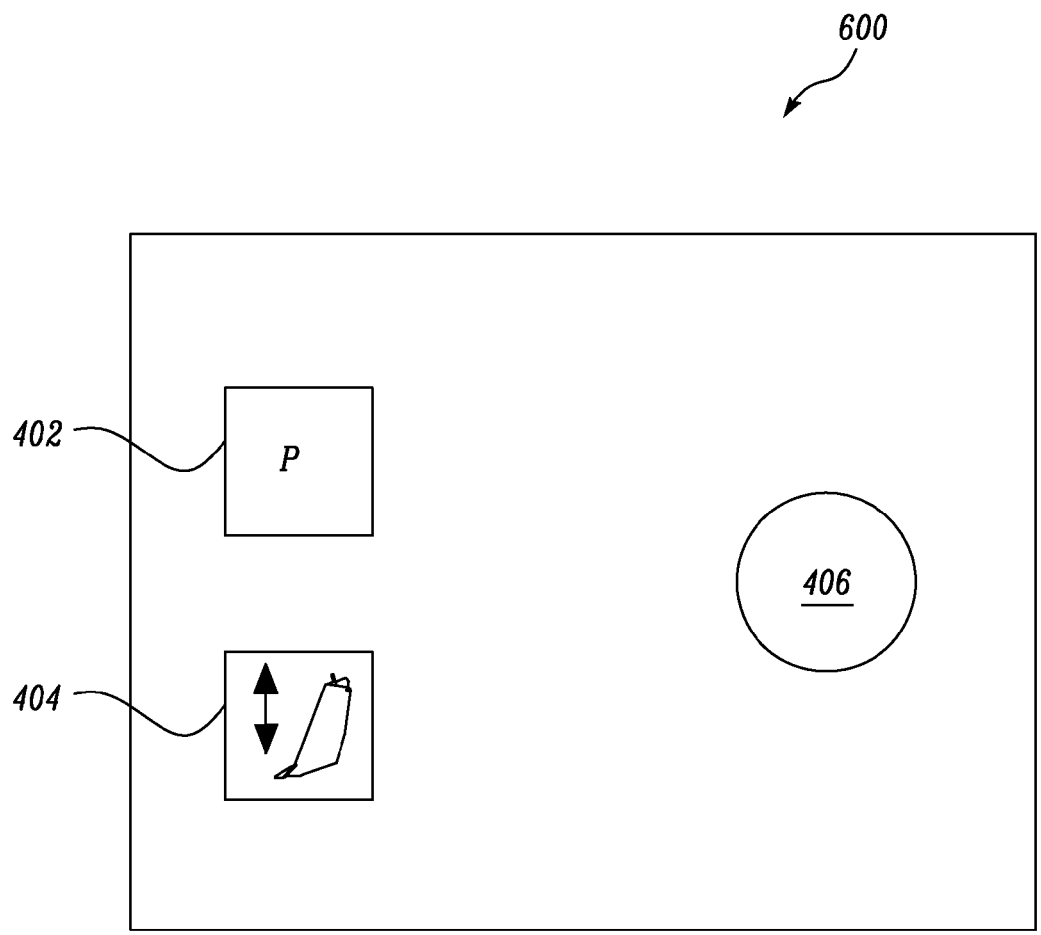

FIG. 6 illustrates yet another exemplary display 600 provided in relation to a control panel. The display 600 includes the first icon 402 and the second icon 404 indicative of the parking status and the implement status respectively. More particularly, the first icon 402 and the second icon 404 may be implemented as light indicators such that the first and second icons 402, 404 are made visible or remain invisible based on the unlocked or the locked state of the parking status and the implement status of the machine 100 respectively. For example, the first and second icons 402, 404 may glow in order to be visible on the display 600. In this case, both the first and second icons 402, 404 glow, indicating the unlocked state of the parking status and the implement status respectively. The display 600 also includes the indicator light 406 which glows red if any one or both of the parking status and the implement status is in the unlocked state. It should be noted that when the indicator light 406 is switched off or does not emit light, the first visual indication is provided to the bystander indicating that the bystander may climb onto the machine 100. However, when the indicator light 406 glows red, the second visual indication is provided to the bystander indicating that the bystander should avoid climbing onto the machine 100.

Figure 7:
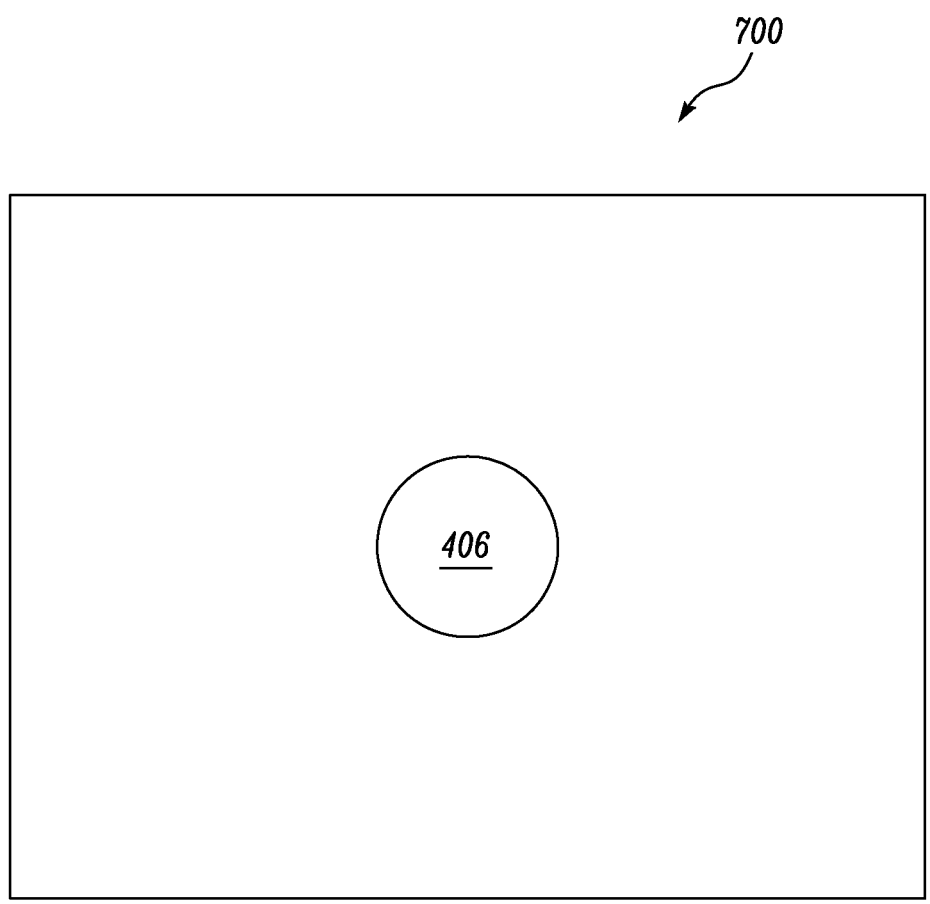

In another case, as shown in FIG. 7, a display 700 may include the single indicator light 406. The indicator light 406 may glow red indicating to the bystander that he should avoid mounting the machine 100. This indication may be provided when any one or both of the parking status and the implement status of the machine 100 are determined to be in the unlocked state by the controller 304. Depending on whether the indicator light 406 does not emit any light or when the indicator light 406 glows red, the first and second visual indications may be provided to the bystander respectively. Alternatively, instead of the single indicator light 406, two indicator lights may be used to display the parking status and the implement status of the machine 100. For example, each of the indicator lights may be configured to glow depending on the parking status and the implement status of the machine 100 respectively.

Figure 8:
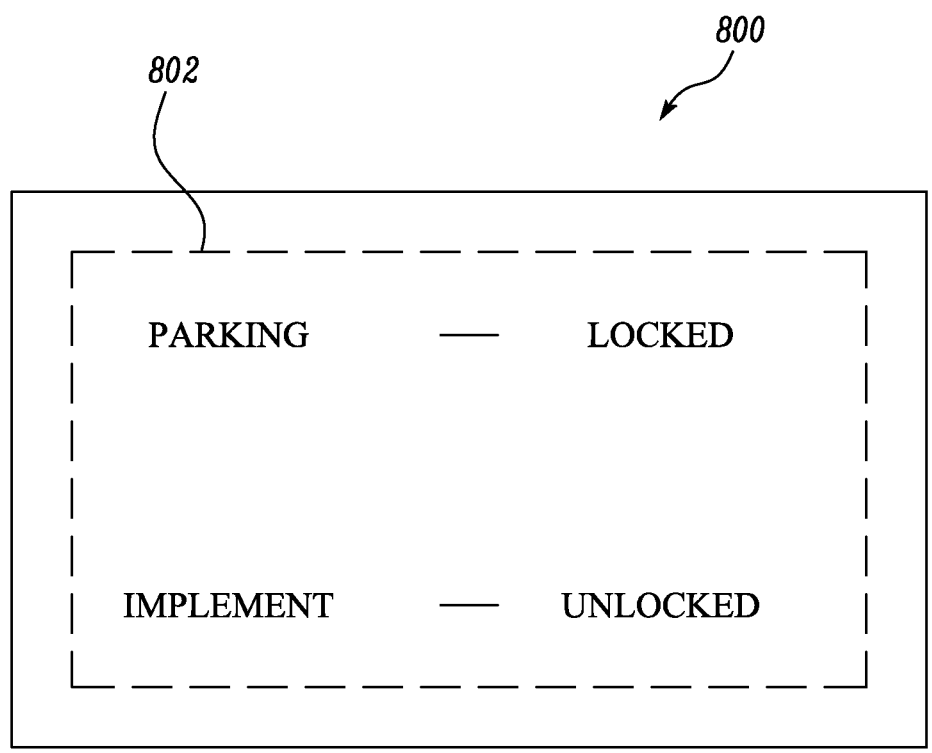

FIG. 8 illustrates another exemplary display 800 for indicating the locked or unlocked state associated with the parking status and/or the implement status of the machine 100. As explained earlier, in one embodiment, the controller 304 may transmit the visual indication to the output module 120 present on the handheld device 202 via the communication system 204. The display 800 notifies the bystander of the parking status and the implement status of the machine 100 through a text message 802. In this case, the text message 802 informs or notifies the bystander that the parking status is in the locked state and the implement status is in the unlocked state.

It should be noted that the various displays explained above are merely on an illustrative basis. Any other display may be used to indicate the parking status and the implement status of the machine 100. Further, the colors, icons and text messages used to indicate the parking status and the implement status of the machine 100 are exemplary and do not limit the scope of the present disclosure. Any other visual indications for conveying the locked or unlocked state associated with the parking status and the implement status may be utilized based on the application.

INDUSTRIAL APPLICABILITY

The bystander must be made aware of the parking status and the implement status of the machine prior to mounting the machine. Also, in some situations, the bystander may be need to know the parking status and implement status in order to perform error checking and remind the operator to apply the park brakes and/or lock the implement 118 in situations where the operator has forgotten to do so.

In the present disclosure, the controller 304 is configured to determine the locked state associated with the parking status and/or the implement status of the machine 100. The visual indication of the determined parking status and the implement status of the machine 100 is transmitted by the controller 304 to the output module 120 and is displayed thereon.

Figure 9:
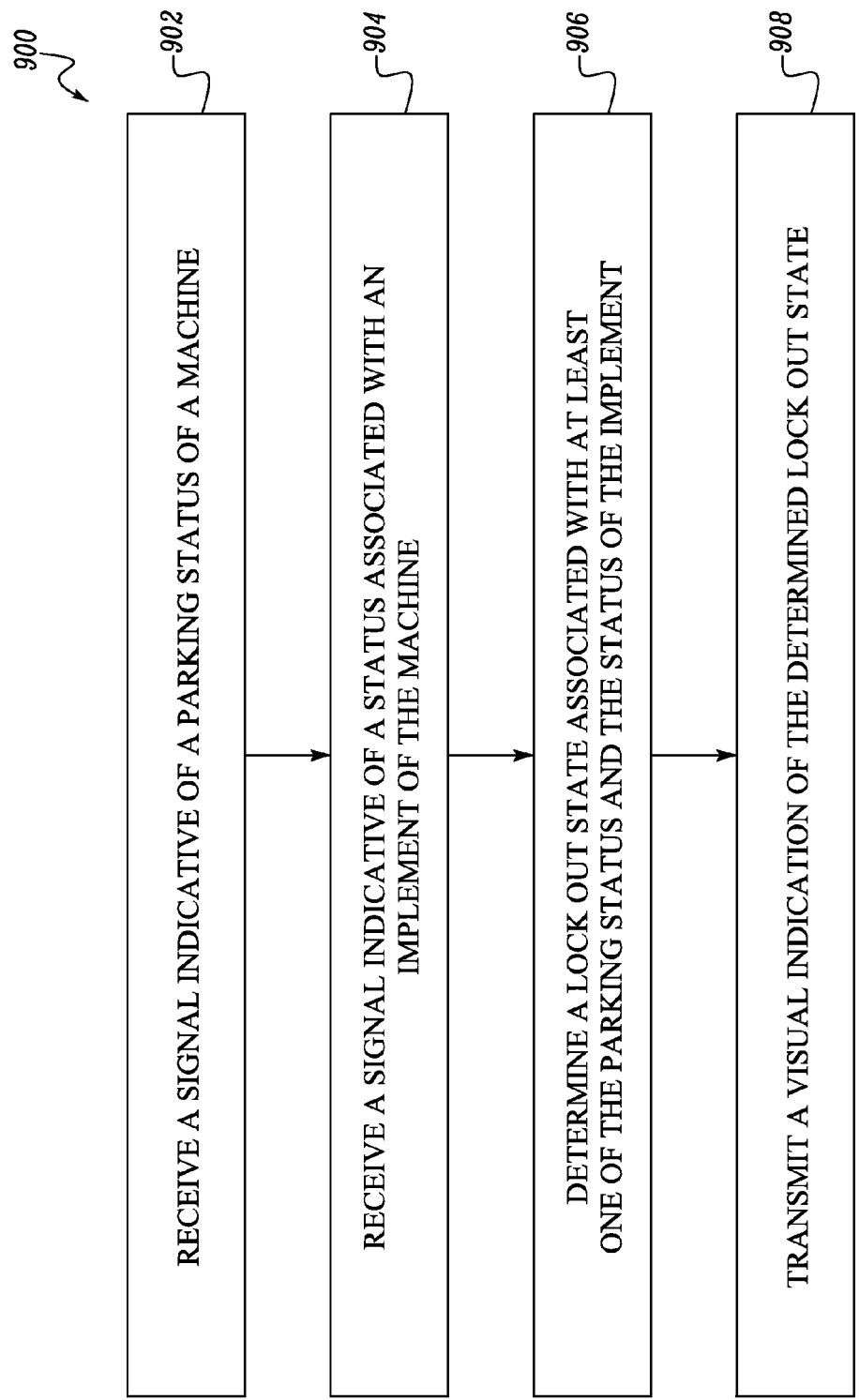
FIG. 9 is a flowchart of a method of indicating an operational status of the machine.

FIG. 9 illustrates a method 900 for providing the visual indication to the bystander. At step 902, the controller 304 receives the signal indicative of the parking status of the machine 100. At step 904, the controller 304 receives the signal indicative of the implement status of the machine 100. As described above, these signals may be received based on the user command and/or the signals issued by the electronic control module.

At step 906, the controller 304 determines the locked state associated with the parking status and/or the implement status of the machine 100. At step 908, the controller 304 transmits the visual indication of the determined locked state associated with the parking status and/or the implement status to the output module 120. Accordingly, the output module 120 may display the visual indication indicating the determined locked state associated with the parking status and/or the implement status. In one embodiment, as shown in FIGS. 4A, 4B, 6 and 7, the combined status of the parking status and the implement status of the machine 100 may be provided to the bystander by transmitting and displaying either the first visual indication or the second visual indication via the indicator light 406 provided in association with the output module 120.

Alternatively, as shown in FIGS. 5A, 5B and 8, the visual indication related to the parking status and the implement status of the machine 100 may be provided separately to the bystander, such that the bystander may ascertain for himself whether to mount the machine 100 or not based on the individual status of the parking status and the implement status of the machine 100. Hence, in both scenarios, based on the visual indication, the bystander may be informed whether to climb onto the machine 100.

One of ordinary skill in the art will appreciate that the exemplary displays provided herein are merely on an illustrative basis and do not limit the scope of the present disclosure. Other similar visual indications may be provided to the bystander to make the bystander aware of the parking status and the implement status of the machine 100. Moreover, the present disclosure may be utilized on any heavy equipment machine having in-cab lockouts for the implement or parking brake.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A method of indicating an operational status of a machine, the method comprising:
   receiving a signal indicative of a parking status of a machine;
   receiving a signal indicative of a status associated with an implement of the machine;
   determining a locked state associated with at least one of the parking status and the status of the implement; and
   transmitting a visual indication of the determined locked state to an output module configured to be displayed at an external location relative to a cabin of the machine, wherein transmitting a visual indication includes:
   transmitting a first visual indication to the output module when the determined locked state of the parking status is a locked parking status and the status of the implement is a locked implement status; and
   transmitting a second visual indication to the output module when the determined locked state of the parking status is a unlocked parking status or the status of the implement is an unlocked implement status.

2. The method of claim 1, wherein the output module is coupled to the machine.

3. The method of claim 1, wherein the output module is coupled to a remote computing system.

4. A machine comprising:
   a power source;
   a body;
   an implement;
   an output module configured to be displayed at an external location relative to a cabin of the machine and configured to provide a visual indication viewable; and
   a controller communicably coupled to the output module, the controller configured to:
   receive a signal indicative of a parking status of the machine;
   receive a signal indicative of the status associated with the implement of the machine;
   determine a locked state associated with at least one of the parking status and the status of the implement;
   transmit a visual indication of the determined locked state to the output module;
   transmit a first visual indication to the output module when the determined locked state of the parking status is a locked parking status and the status of the implement is a locked implement status; and
   transmit a second visual indication to the output module when the determined locked state of the parking status is a unlocked parking status or the status of the implement is an unlocked implement status.

5. The machine of claim 4, wherein the output module includes at least one of a display and an indicator light.

6. The machine of claim 4, wherein the visual indication includes a first set of the indicator lights associated with the parking status of the machine and a second set of the indicator lights associated with the status of the implement.

7. The machine of claim 4, wherein the output module is coupled to the body of the machine.

8. The machine of claim 4, wherein the output module is coupled to a remote computing system.

* * * * *